United States Patent [19] [11] 4,298,643
Miyagawa et al. [45] Nov. 3, 1981

[54] FIBER SHEET FOR FORMING

[75] Inventors: Yoshiaki Miyagawa; Takeshi Mitomi, both of Otsu, Japan

[73] Assignee: Toyo Boseki Kabushiki Kaisha, Japan

[21] Appl. No.: 29,173

[22] Filed: Apr. 12, 1979

[30] Foreign Application Priority Data

Apr. 14, 1978 [JP] Japan .................................. 53/44384
Jun. 30, 1978 [JP] Japan .................................. 53/80235
Aug. 22, 1978 [JP] Japan ................................. 53/102621

[51] Int. Cl.³ ............................................ D03D 27/00
[52] U.S. Cl. ........................................ 428/85; 66/191;
66/192; 66/194; 66/202; 264/257; 264/324;
428/90; 428/91; 428/229; 428/245; 428/253;
428/257
[58] Field of Search ...................... 428/85, 90, 91, 229,
428/230, 231, 253, 257, 258, 259, 212, 310, 95,
245; 66/202, 191, 192, 194; 264/257, 324

[56] References Cited

U.S. PATENT DOCUMENTS

| | | | |
|---|---|---|---|
| 3,066,513 | 12/1962 | Leybourne | 428/310 |
| 3,539,436 | 11/1970 | Hamano | 428/253 |
| 3,558,412 | 1/1971 | Hurz | 428/253 |
| 3,578,546 | 5/1971 | Moroney | 428/253 |
| 3,682,731 | 8/1972 | Morancy | 428/230 |
| 3,867,243 | 2/1975 | Stotter | 428/85 |
| 3,968,283 | 7/1976 | Schutte | 428/253 |
| 4,051,287 | 9/1977 | Hayoshi et al. | 428/253 |
| 4,051,697 | 9/1977 | York | 428/85 |
| 4,109,038 | 8/1978 | Hayoshi et al. | 428/253 |
| 4,123,577 | 10/1978 | Port et al. | 428/253 |
| 4,138,519 | 2/1979 | Mitchell | 428/253 |
| 4,143,197 | 3/1979 | Jasunowicz | 428/253 |

Primary Examiner—James J. Bell
Attorney, Agent, or Firm—Jones, Tullar & Cooper

[57] ABSTRACT

A fiber sheet for forming comprising a low softening point fiber and/or a high stretchability fiber and a high softening point fiber.

11 Claims, 4 Drawing Figures

FIBER SHEET FOR FORMING

The present invention relates to a fiber sheet a compound sheet comprising said fiber sheet and a plastic sheet laminated thereon, and a shaped article made of said compound sheet.

An object of the present invention is to provide a fiber sheet for forming and a compound sheet for forming suitable for subjecting specifically a compound sheet comprising a fiber sheet and a plastic sheet to an integrated forming into cubic structures having various curved surfaces. Another object of the present invention is to provide a fiber sheet for forming and a compound sheet for forming which can give an integrated formed product having excellent forming property and good appearance and hand.

A further object of the present invention is to provide a fiber sheet for forming and a compound sheet for forming which can give integrated formed product with improved sparsity of the texture of the corner part of the formed product having a curved structure of the deep formings. A still further object of the present invention is to provide a fiber sheet for forming a compound sheet for forming free from delamination or deformation of the formed product. Other objects and advantages will become apparent from the description which follows.

Figure 1:
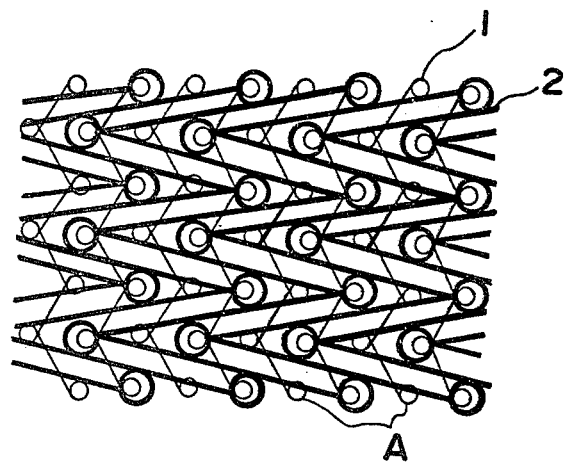
FIG. 1 is an illustrative view of the texture of a warp knit fabric as an embodiment of the present inventory wherein a ground yarn 1 which constitutes the ground portion is composed of fibers having a low softening point and a high stretchability and a pile yarn 2 which constitutes the pile portion is composed of fibers having a high softening point.

While it has been known to manufacture the internal furnishing materials for vehicles, houses and the like by subjecting a sheet of plastics to heat forming to form into solid structures have various curved surfaces, the formed product of a plastic sheet alone has defects in giving flat appearance and hand and cold and hard feel. As a method for settling such defects, there is adopted a method of bonding a piece of cloth on the surface of the formed product of plastic sheet alone. However, due to the insufficiencies in textural stretching of the cloth or in elongation of the fiber or the yarn which constitutes the cloth, it is necessary to cut and sew the cloth according to the pattern beforehand and then to bond the cloth to the plastic sheet together, in order to bond the cloth sufficiently along the cubic curved surface. Not only these steps were disadvantageous in process but also the appearance of the finished compound formed product had low commercial value in view of the inclusions of joint, crease, etc. In order to improve the appearance and the hand, attempts are being made to bond the cloth and the plastic sheet and then to make integrated formed product. However, such process has problems in requiring excessive pressure and temperature for forming and causing deformation to the resulting integrated formed product, etc. These defects are considered to be attributed to the large deformation stress and the small thermoplastic property of the cloth under the forming conditions. As such, there arise such defects that, when heat is exerted at a sufficient temperature so as to permit the cloth to be subjected to heat forming, the fiber is crushed under pressure to lose its fiber form or a recovering property, resulting in extreme aggravation of appearance and hand.

As a result of the strenuous study in an attempt to settle the above defects and to simply and economically obtain an integrated formed product having excellent appearance and hand and high commercial value, the present inventors found that the object of the present invention could be attained when a fiber sheet comprising at least two kinds of specific fibers is used. Thus, the present invention relates to the fiber sheet for forming comprising the constitution of a low softening point fiber and/or a high stretchability fiber and a high softening point fiber.

The fiber sheet according to the present invention can be formed into an integrated formed product having excellent hand in a simple process operation and under the low temperature forming conditions through the steps of making a compound sheet by laminating a plastic sheet on the reverse surface of said fiber sheet and then subjecting the compound sheet to forming. The thus obtained formed product is free from such defects as delamination or deformation. Especially, the fiber sheet wherein the low softening point fiber and/or the high stretchability fiber constitutes the ground portion or the reverse surface portion and the high softening point fiber constitutes the pile portion or the surface portion can give the formed product having excellent appearance and hand with uniform distribution of stress even in the formed product having a curved surface structure, because the ground yarn has excellent stretchability under the forming conditions. Further, in the case of the knitted fabric having the pile or the raising of special structure as described later, a large stretchability is displayed at a low stress under the forming conditions, incorporated in the stretchability derived from its texture. In the formed products having a curved surface structure or a deep draw structure, integrated formed products having extremely excellent appearance and hand and no sparsity of texture at the corner portion are obtainable.

Especially, when a high orientation degree unstretched fiber spun from the crystalline thermoplastic polymer is used for the ground part or the reverse surface part, the fiber sheet shows excellent shape stability and excellent forming property and becomes stabilized by crystallization after the forming so that the formed product shows excellent heat stability and shape stability.

The fiber sheet of the present invention will be illustrated in further detail. The fiber sheet is constituted by the low softening point fiber and/or the high stretchability fiber (both fibers to be referred to as "fiber A") and the high softening fiber (to be referred to as "fiber B"). Preferably the fiber sheet has a lamination structure wherein the ground portion or the reverse surface portion of the fiber sheet is mainly constituted by the fiber A and the pile portion or the surface portion is mainly constituted by the fiber B. Practically, the fiber sheet may take various structures through contrivances on the design conditions such as the knitted or the woven fabric, e.g. a lamination structure wherein the fiber A and the fiber B are clearly separated, a structure wherein the fiber A and the fiber B are mingled together at the boundary, a structure wherein the fiber A and the fiber B are distributed over the whole surface but the fiber A is present in a larger proportion toward the ground portion or the reverse surface portion. In any case, when the fiber sheet is stuck together with the plastic sheet at its ground portion side or the reverse surface side and formed into a compound sheet and then subjected to heat forming, it is necessary for the fiber A at the ground portion or the reverse surface side to be stretched along the curved surface of the forming mold at least under the forming conditions. On the other hand, it is necessary for the fiber B to constitute the pile portion or the surface portion of the fiber sheet and show thermal resistance to endure forming and also not to prevent stretching of the fiber A. To meet this purpose, the fiber B in the fiber sheet must be bent in a plane or a solid state and have a structure not to bear a load. For example, in a pile or a raised structure in the woven or the knitted fabric, it is desirable to adopt a fiber sheet having the texture to form the ground portion being constituted mainly by the fiber A and the pile or the raised portion by the fiber B. Alternatively, the fiber sheet may be the one having cubic structures such as the laid structure like a double structure or a multilayer structure, or a fiber sheet comprising an unwoven web provided with a pile by tufting. However, in order to give the bidirectional (two-dimensional) stretchability, use of the knitted fabric is especially preferred. Further, in order to make the sparsity of texture at the bent portion less conspicuous, the knitted fabric having the surface effect such as pile, raising, etc., for example, circular knit single velour, tricott pile knitted fabric, etc. are more preferred. Also, it is effective to use woven fabric comprising the fiber A for the textural warp and the textural weft and the fiber B for the pile or the fuzz. Further, particularly preferred knitted fabric from the viewpoints of displaying the excellent bidirectional stretchability by a large stretchability in texture in addition to the stretchability of the fiber itself, and yet giving scarce showing of the texture of the formed product at its bent part, is the following warp knit fabric constituted by the ground part and the pile part. Such a warp knit fabric is prepared in such manner that the pile portion is formed by the shogging motion between the odd number needles under the yarn arrangement of every other stitch or the pile portion is formed by the shogging motions between more than 1 stitch and plural stitches into the loop piles without forming stitches every other course. FIG. 1 is a textural drawing to show an example of the former warp knit fabric, wherein 1 is a ground yarn which constitutes the ground portion and 2 is a pile yarn which constitutes the pile portion. The pile portion has such construction that the stitches (A) to be formed by the ground yarn only are formed every other stitch by the shogging motion between the odd number needles under the yarn arrangement of every other needle, and yet, when a single reed is used for the pile yarn, such a construction is formed that each pile yarn stands independent and is less apt to be bound mutually by other pile yarns. Excepting the point of the yarn arrangement of the pile yarn being at every other needle, the above warp knit fabric is the same as the warp knit fabric called the French pile, and it may be raised in the same manner as in the French pile. The raised product is bulky and has excellent feel and hand, and further has an advantage of further improving the defect of the deep drawn formed product which shows sparsity of texture at the corner part.

Figure 2:
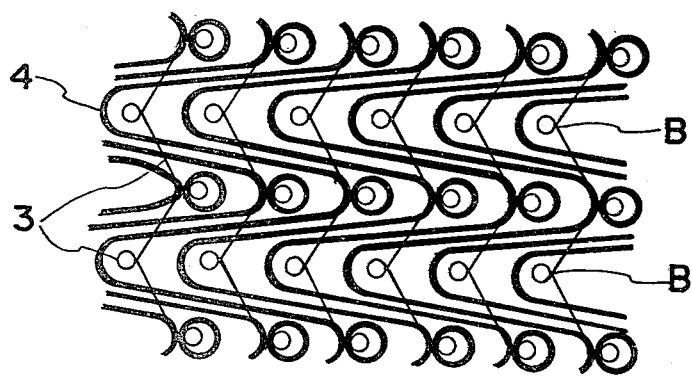
FIG. 2 is an illustrative view of the texture of a warp knit fabric representing an alternative embodiment of the present invention having a ground yarn 3 and a pile yarn 4.

FIG. 2 is a textural drawing of the warp knit fabric to show an example of the latter warp knit fabric, wherein 3 is a ground yarn to constitute the ground portion and 4 is a pile yarn to constitute the pile portion. The pile portion is knitted in such manner as to give shogging motion between more than 1 needle and plural needles and yet not to form stitches every other course, thereby resultantly forming the loop piles. Accordingly, when a single reed is used for the pile yarn, the stitches (B) to be formed with the ground yarn are provided every other course, and yet the stitches are constituted by the pile yarn without being bound by the adjacent pile yarn at all while forming the stitches every other stitch on the same wale with sufficient allowance reserved to the yarn length with the loop pile. Accordingly, under the cooperative actions of the large stretchability of the ground yarn (fiber A) which constitutes the ground portion under the forming conditions and the stretchability produced from the knit texture, the warp knit fabric can display extremely large stretchability under the forming conditions and has no distortion at all, leading to entire settlement of such defects as the deformation of the integrated formed product or delamination. As the said knitted fabric forms the loop pile on the surface of the knitted fabric, provision of the shogging motion of the pile yarn at an interval of several needles will provide bulkiness, satisfactory hand, and scarce or entirely no showing of the defects of sparsity of the corner part fabric in the deep drawing formed product. Further, when said warp knit fabric is formed not into two reed texture but for example three reed texture with the front reed and the back reed textures formed in the same manner as in the case of the above two reeds, and the yarn similar to the pile yarn of the front reed is used for the middle reed, and knitting is made with the shogging motion between the odd number needles with the yarn arrangement at every other needle, the stitches formed by the ground yarn only are to be present at an interval of 1 wale and at an interval of 1 course. From the aspect of the stretchability of the stitch, the fabric made by the above method involves a possibility of being slightly inferior to the case of using the two reeds, but the deep drawn fabric does not show any sparsity of fabric at the corner part and the formed product having good hand is obtainable with balanced stitches per se.

With regard to the low softening point fiber which plasticizes under the forming conditions and displays stretchability under the low stress, there are exemplified the fabrics produced by spinning either solely or by mixture or in combination of the thermoplastic polymers such as copolymerized polyamide, copolymerized polyester, copolymerized polyacrylonitrile, polyolefin, polyvinyl chloride, polychlal, polyamide, polyalkylene terephthalate, and the like. Especially preferred fibers are those having the softening point below 220° C., especially 80° to 220° C., more particularly 150°–220° C., and having the stretchability of more than 200%, especially more than 300%, at a low stress under the forming conditions especially under heating at 150° C.

Said fiber is used by optionally selecting depending on the softening point of the high softening point fiber to be mixed, the molding conditions, the kind of the plastic sheet, the heat resistance of the formed products, etc. For example, it is desirable for the difference of the softening points between the low softening point fiber and the high softening point fiber to be at least 20° C., especially more than 50° C.

The high stretchability fibers having sufficient stretchability even at room temperature are the fibers having an elongation at break of at least 50%, preferably more than 100%, more preferably more than 150%, for which there are exemplified the elastic fibers such as polyurethane elastic fiber, polyester elastic fiber or polyamide elastic fiber, the highly oriented undrawn fiber obtainable by spinning at high speed the crystalline high polymer such as polypropylene, polyamide, polyester, etc. It is specially desirable for said high stretchable fiber to show a large deformation at relatively low stress but have a low softening point. Especially, the high orientation degree unstretched fiber is specially preferred as having a low softening point and high strechability and is stabilized by crystallization after the forming. Usually preferred is a high orientation degree unstretched fiber (partially oriented yarn) having an elongation at break of 100 to 500%, although it is somewhat varied with the kind of the polymer. Also, in consideration of the stability against the time lapse and the heat resistance after the forming of the fiber, the polyester undrawn fiber having the birefringence ($\Delta n$) of 0.02-0.08 and the polyamide undrawn fiber having the birefringence ($\Delta n$) of 0.02-0.045 are more preferred.

The birefringence of the filament is computed from the following equation by the use of sodium D rays (wavelength, 589 m$\mu$) with the filaments disposed in a diagonal position:

$$n = (n\lambda + \gamma)/\alpha$$

wherein n is the interference fringe due to the degree of orientation of the polymer molecular chain; $\gamma$ is the retardation obtained by measuring the orientation not developing into the interference fringe by means of a Berek's compensator; $\lambda$ is the wavelength of the sodium D rays; and $\alpha$ is the diameter of the filament.

As the polyester to be used for the production of the high orientation degree unstretched fiber, polyethylene terephthalate or the copolymerized polyester comprising mainly ethylene terephthalate repeating units is preferred. As the copolymerizing component, there are exemplified an acid component (e.g. isophthalic acid, 5-sodium sulfoisophthalic acid, adipic acid, sebacic acid, and the like), a glycol component (e.g. propylene glycol, butane diol, diethylene glycol, neopentyl glycol, cyclohexane dimethanol and the like), an oxycarboxylic acid (e.g. oxyethoxybenzoic acid), and the like. With regard to the copolymerization rate, it is desirable from the points of stability against time lapse and thermal stability that the proportion of ethylene terephthalate is more than 85 mol %.

The polyamides to be used for the production of the high orientation degree unstretched fiber are the copolymerized polyamides and the like comprising mainly the polyamide $-[HN(CH_2)_{n-1}CO]_p-$ from $\omega$-amino acid $H_2N(CH_2)_{n-1}COOH$ or lactam or the polyamide, $-[HN(CH_2)_m NHCO(CH_2)_{n-2}CO]_p-$ from $\omega,\omega'$-diamine $H_2N(CH_2)_m NH_2$ and $\omega,\omega'$-dicarboxylic acid $HOOC(CH_2)_{n-2}COOH$ and their repeating units, wherein $\omega,\omega'$ show the position of the terminal of the molecular chain; p is polymerization degree; and m and n are the positive integers. As the copolymerization component there are usable the known diamine component and/or dicarboxylic acid component.

The low softening point fiber and the high stretchability fiber may be used by mixing each other, or by mixing with the high softening point fiber in the amount and the usage which does not inhibit the effect in the forming held by those fibers. An example of such use is a cover yarn made by the high softening point fiber.

On the other hand, the high softening point fibers include the natural fibers such as cotton, rayon, hemp, wool, camel hair, synthetic fibers such as polyester, polyamide, aramide and phenol-formaldehyde, thermoplastic synthetic fibers treated with melt-resisting finishing with melamine resin, and the mixed fibers of them. The said fiber is used by appropriate selection depending on the softening point of the low softening point fiber to be used, forming temperature, kind of plastic sheet, etc. Usually, the softening point is preferably higher than 170° C., and especially higher than 220° C. In case of the dyeing after preparation into the fiber sheet, combination of the materials which stand simultaneous dyeing is preferred.

The fiber A and/or the fiber B may be previously dyed in the same color or the different colors, or may be previously provided with such reformation treatments as to impart incombustibility, antistatic property, soil-proof property, water repellency, water and oil repellency, anti-pilling property, dyeability, easily dyeable property, anti-fungal property, softness, light resistivity, etc. in an optional stage between the polymer production and the yarn manufacture. Especially, in the case of the fiber A, by treating with the parting agent such as silicone resin, fluorine resin, etc., the deformation preventing property and freedom of the fiber A in the fiber sheet texture at the time of the forming are improved to give favorable result. Alternatively, after the formation into the fiber sheet, the product may undergo reformation treatment to impart various properties as above, coloring treatment such as dyeing or printing, polyurethane treatment to impart elasticity, anti-pilling finishing to the pile, etc.

The fiber sheet according to the present invention is subjected to an integrated molding into the desired shape by vacuum forming, press forming, etc. after formation of the drawn or undrawn, thermosettable film or plate-like plastic sheet by lamination or underlaying on its ground side or the reverse side, i.e. on the side on which the fiber A is present, into a compound sheet. Lamination of the plastic sheet can be made by extrusion-lamination of the melt polymer or melting by softening under heat of the low softening fiber of plastic sheet or fiber sheet, but usually it is convenient to give such lamination by the bonding of the plastic sheet with the fiber sheet by means of an adhesive.

Figure 3:
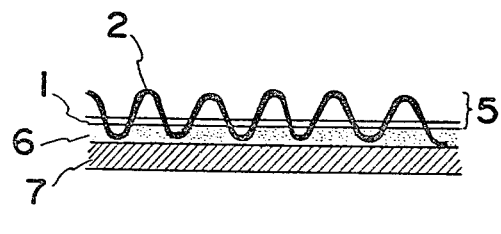
FIG. 3 is an enlarged sectional view for illustration of a compound sheet consisting of a fiber sheet 5 composed of a ground yarn 1 and a pile yarn 2, an adhesive layer 6 and a plastic sheet 7.

FIG. 3 is an illustrative view of the section to show an example of the compound sheet made by bonding with an adhesive and laminating. That is to say, the fiber sheet 5 composed of the ground yarn 1 and the pile yarn 2 is bonded with the plastic sheet 7 by means of the adhesive 6 to form the compound sheet.

As the plastics for the plastic sheet material, it is preferred to use universal thermoplastic resin like vinyl chloride resin, ABS resin, polyolefin resin, copolymerized polyester resin, copolymerized polyamide resin, or the like, or low softening point resin. High softening point polyethylene terephthalate, polyamide, and the like are preferred to be of undrawn and low density form. However, the present invention is not to be limited to them, but may be selected from the unstretched or the stretched sheet of the thermoplastic resin material wherein the fiber B can be processed by forming under the conditions not to melt or deform under the forming conditions. Of course, the resins of the type to be hardened after the molding are usable.

The adhesive to be used is that which has affinity with the fiber A and the plastic sheet and gives sufficient bonding strength. Usually, an adhesive which shows thermoplastic property during forming is used. Such adhesive may be the one which is hardened at the time of or after the forming by the heat of forming, or the one which is hardened under irradiation of light after the forming. The adhesive is usually usable in an optional state such as in the form of film, unwoven fabric, powder or granule, solution or melt, to be selected appropriately according to the means of production of the compound sheet. In case of the use of the film-like or the unwoven fabric-like adhesive, forming may be made while bonding the fiber sheet and the plastic sheet with said adhesive. Preferred adhesives are polyurethane adhesive, polyvinyl adhesive, denaturated polyolefin adhesive, synthetic rubber, copolymerized polyamide, copolymerized polyester, and the like, but the adhesives are not limited thereto. If desired, the plastic material and the adhesive may be mixed with plasticizer, combustion-proof agent, antistatic agent, inorganic filler, stabilizer, bond accelerating agent, foaming agent or the like.

Figure 4:
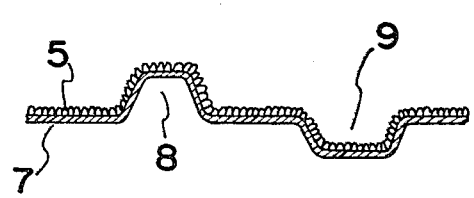
FIG. 4 is an enlarged sectional view of an integral shaped product prepared by mold processing the compound sheet, as shown in FIG. 3, consisting of a fiber sheet 5 and a plastic sheet 7 having a projection 8 and a recess 9.

The thus produced compound sheet is subjected to integrated forming into the desired form by vacuum forming, press forming, etc. FIG. 4 is an illustrative cross-sectional view to show an example of the integrated forming product having a curved surface form formed by the use of a compound sheet. It is an example wherein the compound sheet of FIG. 3 comprising the lamination of the fiber sheet 5 and the plastic sheet 7 has been formed integrally into a cubic form having the projection 8 and the recess 9.

The formed product made by integrated forming by the use of the fiber sheet of the present invention has excellent appearance and hand. In forming process, no excessive force or heat is required, and the force of the fiber sheet tending to return to the original form after the forming can almost be disregarded. Accordingly, it is possible to obtain beautiful formed product having fidelity to the original forming shape without deformation or delamination. Thus, the formed products can extensively be utilized for internal furnishings for vehicles such as automobile, tramcar, etc., internal furnishings for vessel, aircraft, etc., decorative plates for furniture or domestic electric apparatuses, and formings of toys and others.

The invention is illustrated by way of the following Examples.

The term "softening point of the fiber" in the present invention is meant by the temperature at which the fiber becomes sharply apt to be deformed when heated at a fixed rate. The softening point was measured by the undernoted method:

When a stripe of a piece of fiber or a bundle of several pieces of fiber, under exertion of a load of 0.01 g/d, is subjected to an elevated temperature in air at the rate of 1° C./min., the fiber shows shrinkage on arrival at a certain temperature range. The fiber is caused to shrink in a manner to have a constant load. The relations between the size variation of the specimen fiber and the temperature at that time are plotted into a graph, wherein the temperature at which said change sharply occurs is taken as the softening point.

The elongation at break of the elastic fiber was measured by the following method: A constant speed stretch type tensile tester with automatic recording device is provided with the hook-like chucks and the distance between the hooks is set to 50 mm. A test sample folded by 5 folds into loop forms is set onto the hook, and is drawn at the tensile speed of 500 mm/min. Its elongation rate at the time of the breakage is read from the scale on the chart. The elongation at break of the fibers other than the elastic fiber is measured in accordance with JIS (Japanese Industrial Standard) L-1070-78.

EXAMPLE 1

The portion of the base texture (ground portion) was knitted with 150 d. polypropylene multifilament (softening point, 130° C.) and the portion of the pile was knitted with 200 d. nylon 6 multifilament stretched false-twist textured yarn (softening point, 180° C.) to obtain a single velour circular knit fabric.

The above knit fabric was stuck to a vinyl chloride resin plate of 0.8 mm thick with a commercial two-liquid reaction type urethane adhesive (HAMATITE ®, made by Yokohama Rubber Co., Ltd.) to form a compound sheet, which was then heated to 170° C. to effect vacuum forming.

The polypropylene yarn which forms the base texture (ground portion) can retain the size of the knitted fabric because of its resilience under the low temperatures in the knitting and the scouring finishing process, but at the vacuum forming temperature of 170° C. it has sufficient softness suitable for forming, and can be formed simultaneously with the resin plate.

The nylon 6 yarn constituting the pile portion was not damaged at the above forming temperature and could retain its original pile form after forming and cooling. In the forming, the nylon yarn partially sustains a large elongation force, but in the pile texture the nylon absorbed its elongation due to its sufficient bending shape without causing elongation of yarn, and variation in appearance by extreme variation of pile density was small to a negligible degree.

As above, there was obtained an integrated formed product having an excellent appearance and being free from peeling or deformation even against a long time exposure to the high temperature and the high moisture conditions in summer season.

EXAMPLE 2

In producing a spun bonded unwoven fabric (for example, Japanese Patent Publication No. 4993/1962), there was used as a polymer an ethylene terephthalate/isophthalate copolymer (molar ratio of terephthalate units and isophthalate units = 70:30) having an intrinsic viscosity of 0.65 (measured at 30° C. in a mixed solvent of phenol/tetrachloroethane = 6/4 in ratio by weight). By utilizing the pressurized air at a volume smaller than usual, there was obtained a spun bond type unwoven fabric having about 100% elongation at break, softening point at 165° C., a large stretchability at the softening temperature, with random fiber arrangement and density of 120 g/m². The resulting unwoven fabric was subjected to the tufting finish by the use of a stretched false-twist textured yarn of polyethylene terephthalate (intrinsic viscosity, 0.58) multifilament 500 deniers having the softening point at 238° C. After dyeing the resulting pile cloth, a synthetic rubber type adhesive was used to laminate the pile cloth with the 1.2 mm thick plate comprising ABS resin and obtained a compound sheet. After heating the compound sheet to 180° C., the compound sheet was formed by vacuum forming into the formed product having the curved surface shape.

As a result, there was obtained simply and economically an integrated formed product having excellent appearance and handle and being free from peeling or deformation.

EXAMPLE 3

Polyethylene terephthalate-isophthalate (terephthalic acid/isophthalic acid molar ratio=3/1) (intrinsic viscosity obtained in the same manner as in Example 2: 0.60) was subjected to melt spinning at 280° C. to obtain a copolymerized polyester multifilament yarn of 150 d/48 filaments having the softening point at 170° C. and the elongation at break of about 55%.

With the above yarn used as a base weft and a base warp, and the drawn falst-twist textured yarn of polyethylene terephthalate same as the Example 2 (150 d/36 filaments) as a pile warp, and with the arrangement of the pile warp and the base warp made at the rate of 1 to 3, there was woven a one-face pile fabric having the warp density of 90 stripes/25 mm, weft density of 90 stripes/25 mm, and density per square meter of 200 g/m². In the said woven fabric, the copolymerized polyester fiber of softening point at 170° C. constitutes the base weft and the base warp to maintain the size stability of the fabric, and the polyethylene terephthalate fiber having the softening point at 240° C. constitutes the pile warp to form a bent condition. When the said fabric is subjected to heat-forming, the former yarn possesses a large stretchability in the axial direction of the yarn, and the latter yarn, though not showing a substantial stretching of yarn, shows a trend of approach to a linear line from the bent form, so that the fabric displays the large two-dimensional stretchabilities and can be provided with satisfactory forming property.

The above fabric was provided with the dyeing finish, after which the vinyl chloride resin was lined in the thickness of 0.6 mm to form into a compound sheet. The obtained compound sheet was subjected to vacuum forming at 160° C. for use as a decorative board for furniture. The resulting formed product was excellent in both appearance and hand in comparison with the conventional products of plastic sheet alone and also had favorable stability.

EXAMPLE 4

Polyester comprising polyethylene terephthalate (intrinsic viscosity, 0.60) was subjected to melt spinning at a melting temperature of 280° C. and a spinning speed of 3000 m/min to obtain a high orientation degree unstretched multifilament yarn of 210 d/30 filaments having the softening point at 215° C., elongation at break of about 200%, birefringence 0.034 and density 1.34.

With the above yarn used as a ground portion and the yarn-dyed, high orientation degree nylon 6,6 multifilament stretched false-twist crimped textured yarn of 210 d/48 filaments (softening point, 240° C.) as a pile part, a velour texture was knitted on a single circular knitting machine to obtain a pile knitted fabric having the density per square meter of 300 g/m². In the above knitted fabric, the high orientation degree unstretched polyester fiber constitutes the ground portion to maintain the size stability of the knitted fabric, and the high orientation degree stretched nylon yarn constitutes the pile portion to form a bent state, so that, when the knitted fabric is subjected to heat forming, the former yarn shows substantial elongation in the axial direction of the yarn at the time of the molding, but the latter yarn does not substantially show elongation only because of the bent yarn being modified toward a linear form.

On the other hand, an adhesive comprising the saturated polyester type resin (BYLON 30S®, made by Toyo Boseki Kabushiki Kaisha) and the curing agent was applied to the 0.7 mm thick ABS resin plate to a thickness of 20 microns in solid component which was laminated on the reverse surface side of the above knitted fabric to obtain a compound sheet.

After heating the above compound sheet to 160° C., the compound sheet was subjected to vacuum molding by the use of a curved surface-shaped mold for vacuum forming. The high orientation degree unstretched polyester fiber showed more than 3 fold elongation under the above forming temperature, and yet the stress to be produced at that time was extremely small to permit forming of even a curved surface shape without difficulty, and a beautiful finishing was obtained without distortion after the forming. Also, in view of the fact that the nylon 6,6 pile fiber, while being elongated at the portion of the curved surface, has an even distribution of the stress to show sufficient effect of preventing a state of sparsity of texture and that it does not cause heat deformation, a cubic formed product having excellent appearance could be obtained. Also, the high orientation degree unstretched polyester fiber was stabilized by crystallization after the thermal forming to give an integrated molded product having extremely good stability, and had sufficient durability and excellent appearance and hand for use as an internal furnishing plate for automobile.

EXAMPLE 5

Nylon 6 was subjected to melt spinning at the melting temperature of 260° C. and the spinning speed of 1200 m/min to obtain a high orientation degree unstretched multifilament yarn of birefringence 0.020 and 165 d/filaments (softening point, about 165° C.; elongation at break, about 350%). By the use of the thus produced yarn as a ground portion and the yarn-dyed 210 d/48 filaments high orientation degree nylon 6 multifilament stretched false-twist crimped textured yarn (softening point, 185° C.) as a pile portion, a velour texture was knitted with a single circular knitting machine to obtain a pile fabric of density per square meter 340 g/m². In the thus produced knitted fabric, the high orientation degree unstretched nylon 6 fiber forms a ground portion to maintain the size stability of the knitted fabric and the high orientation degree nylon stretched yarn forms a pile portion to show a bent state, so that, when the knitted fabric is subjected to heat forming, the former yarn shows a substantial elongation in the axial direction of the yarn at the time of the forming but the latter yarn does not show substantial elongation of yarn with only the bent yarn showing an access to the linear form.

To the above knitted fabric, a commercially available two-liquid reaction type urethane adhesive (HAMATITE$^R$, made by The Yokohama Rubber Co., Ltd.) was applied to a thickness of 30 microns in solid component and the knitted fabric was laminated with the vinyl chloride resin plate of 0.8 mm in thickness and the bonded product was dried to give a compound sheet. The thus obtained compound sheet, after having been heated to 160° C., was subjected to vacuum forming by the use of a mold for vacuum forming having a curved surface shape. The high orientation degree undrawn nylon fiber showed an elongation of about 4 folds under the above forming temperature, and yet, due to the extremely small stress produced at that time, the nylon fiber could be formed without difficulty even into a curved shape, and a beautiful finishing was obtained without distortion after the forming. The stretched nylon 6 pile fiber undergoes stretching at the curved surface portion, but due to the fact that the stress is evenly distributed to give sufficient effect of preventing sparsity of texture and also due to its scarce deformation by heat, there could be obtained a cubic molded product having excellent appearance. The said molded product had sufficient durability as an internal furnishing plate for automobile and was excellent in both appearance and hand.

EXAMPLE 6

As a ground yarn, a spandex core yarn comprising 20 d. polyurethane spandex yarn (softening point, 165° C.; elongation at break, about 550%) covered with 70 d/24 filaments nylon 6 false-twist textured yarn was arranged in a full set on the back reed of the 28 gauge two-reed tricott machine, to which shogging motion of 1-0/1-2 was exerted. There are arranged 140 d/48 filaments nylon 6,6 false-twist textured yarn (softening point, 235° C.) on the front reed under the yarn arrangement of every other piece and was knitted under 1-0/5-6 shogging motion into a warp knitted fabric having the knitting density of 70 courses/inch.

After dyeing and raising of the knitted fabric, the polyvinyl chloride paste was applied to the reverse surface of the knitted fabric at the rate of 300 g/m$^2$ in solid component, heated and cured to obtain a compound sheet. The resulting compound sheet was heated to 170° C. and then was subjected to vacuum forming by the use of a mold for vacuum forming having a curved surface shape.

The spandex core yarn showed about 4 folds elongation under the above molding conditions, and could be formed without difficulty even if the stress produced at that time was small and had a curved surface form, and further, in comparison with the circular knitted fabric, sparsity of the texture at the corner part was further improved, and the appearance and the hand were also improved.

EXAMPLE 7

A high orientation degree unstretched polyethylene terephthalate filament of birefringence ($\Delta$n) 0.028 (110 d/36 filaments; softening point, about 210° C.; elongation at break, about 220%) was arranged in full set on the back reed of 28 gauge 3-reed tricott machine, to which a shogging motion of 1-0/1-2 was exerted. On the middle reed a polyethylene terephthalate stretched false-twist textured yarn (75 d/24 filament; softening point, about 240° C.) was arranged under the yarn arrangement of every other piece.

On the front reed a yarn similar to that used on the middle reed was used to give shogging motion of 1-0/5-6 under the same yarn arrangement as that on the middle reed to knit a warp knitted fabric having a knitted fabric density of 60 courses/inch. After the above knitted fabric was subjected to the dyeing and the raising finishings, a web (density per square meter, 20 g/m$^2$) produced from the polybutylene terephthalate-isophthalate-polytetramethylene glycol block copolymer (melting point, 180° C.) was used as an adhesive to laminate a 0.4 mm thick vinyl chloride sheet on the reverse surface of the knitted fabric to give a compound sheet. The resulting compound sheet, after having been heated to 170° C., was subjected to vacuum forming with a mold for vacuum forming having a curved surface shape to make a decorative plate for furniture. In this case, the front and the middle pile yarns were the textures to give restraint each other, but not to a degree to give ill effect to the actual forming. They had a low stress, showed about 3.5 folds elongation, showed favorable forming property, being free from sparsity of the texture at the corner part, and had extremely excellent appearance and hand. Also, the formed product showed extremely excellent shape stability over a long period.

EXAMPLE 8

The high orientation degree unstretched polyethylene terephthalate filament yarn used in Example 7, used as a ground yarn, was set on the back reed of 28 gauge 2-reed tricott machine in a full set, to which a shogging motion of 1-0/1-2 was exerted. On the other hand, a polyethylene terephthalate stretched false-twist textured yarn (150 d/48 filaments; softening point, about 240° C.) was arranged in a full set yarn arrangement, to which 1-0/5-5 shogging motion was given to knit a warp knitted fabric having the knitted fabric density of 70 courses/inch. After subjecting the resulting knitted fabric to dyeing, the fabric was made into a compound sheet in the same manner as in Example 7, and then was subjected to heat forming. The said knitted fabric showed about 4.5 folds elongation under the forming conditions and yet the stress to be produced at that time was extremely small to a degree to permit forming of the knitted fabric without difficulty even into a curved shape. Further, it could give excellent appearance and hand more than the warp knitted fabric of Example 6 and improve sparsity of the texture at the corner part. The formed product showed excellent durability and extremely excellent shape stability for use as an internal furnishing for automobile.

EXAMPLE 9

As a ground yarn, a high orientation degree unstretched polyethylene terephthalate filament yarn used in Example 7 was arranged in full set on the back reed of 28 gauge 3-reed tricott machine, to which 1-0/1-2 shogging motion was given. A stretched false-twist textured yarn of polyethylene terephthalate copolymerized with 2.5 mol % of 5-sodium sulfoisophthalic acid (75 d/24 filaments; softening point, about 240° C.) was arranged under the yarn arrangement of every other piece on the middle reed, to which 1-0/3-4 shogging motion was exerted. The same textured yarn as that applied to the middle reed was arranged on the front reed in a full set, to which 1-0/5-5 shogging motion was given to knit the warp knitted fabric having the knitted fabric density of 60 courses/inch. After dyeing and finishing, the said knitted fabric was formed into the compound sheet in the same manner as in Example 6, and subjected to heat forming. The said fabric showed about 4 folds elongation under the forming conditions at a low stress. Without having sparsity of texture at the corner part and with the stitches stabilized, there are obtained a formed product having extremely excellent appearance and hand. The size stability of the formed product was also quite stabilized over a long period.

What is claimed is:

1. A yarn interlaced fabric sheet, adapted for lamination to a plastic sheet to provide a laminate having a fabric surface having excellent appearance and hand, which fabric sheet comprises (A) a first side, adapted for lamination to a plastic sheet, comprised mainly of a stretchable, low softening point fiber having a softening point between 80° and 220° C. and an elongation at break of at least 50% and (B) a second appearance contributing side comprised mainly of a fiber having a softening point at least 20° C. higher than the softening point of the low softening point fiber.

2. The fabric sheet for forming according to claim 1, wherein the fabric sheet for forming is selected from the group consisting of a pile knitted fabric and a raised knitted fabric.

3. The fabric sheet for forming according to claim 2, wherein the fabric sheet for forming is selected from the group consisting of a circular knitted single velour and a tricott pile knitted fabric.

4. The fabric sheet for forming according to claim 2, wherein the pile portion is a pile warp knitted fabric formed by knitting under the yarn arrangement for every other needle and under exertion of the shogging motion between the odd number needles.

5. The fabric sheet for forming according to claim 2, wherein the pile portion is a warp knitted fabric formed by knitting so as to form loop piles under exertion of the shogging motions between more than one needle and plural needles and yet without forming stitches every other course.

6. The fabric sheet for forming according to claim 1, wherein the fiber which has a low softening point and a high stretchability is a high orientation degree unstretched fiber (partially oriented yarn) obtainable by high sped spinning of a crystalline thermoplastic polymer.

7. The fabric sheet for forming according to claim 6, which is a high orientation degree polyester unstretched fiber having the birefringence ($\Delta n$) of 0.02 to 0.08.

8. The fabric sheet for forming according to claim 6, which is a high orientation degree polyamide unstretched fiber having the birefringence ($\Delta n$) of 0.02 to 0.045.

9. The fabric sheet according to claim 6, wherein the high orientation degree unstretched fiber has an elongation at break of 100 to 500%.

10. A formable laminate which comprises:
(A) A yarn interlaced fabric sheet comprising:
  (i) a first side comprised mainly of a stretchable, low softening point fiber having a softening point between 80° and 220° C. and an elongation at break of at least 50%, and
  (ii) a second appearance contributing side comprised mainly of a fiber having a softening point at least 20° C. higher than the softening point of the low softening point fiber; and
(B) a formable plastic sheet said fiber sheet (A) being bonded at said first side to said formable plastic sheet (B).

11. A process which comprises heat forming an article from a laminate comprising:
(A) A yarn interlaced fabric sheet comprising:
  (i) a first side comprised mainly of a stretchable, low softening point fiber having a softening point between 80° and 220° C. and an elongation at break if at least 50%, and
  (ii) a second appearance contributing side comprised mainly of a fiber having a softening point at least 20° C. higher than the softening point of the low softening point fiber; and
(B) a formable plastic sheet, said fiber sheet (A) being bonded at said first side to said formable plastic sheet (B), said heat forming being conducted so that the stretchable, low softening point fiber stretches at the surface of the fabric sheet bonded to said plastic sheet along curved surfaces formed in the bonded surface of the plastic sheet during the heat forming process, while the fiber having an at least 20° C. higher melting point remains thermally stable at the appearance contributing side of the bonded fabric layer.

* * * * *